(12) United States Patent
Mahoney et al.

(10) Patent No.: US 7,397,392 B2
(45) Date of Patent: Jul. 8, 2008

(54) METHOD FOR REMOTE MONITORING EQUIPMENT FOR AN AGRICULTURAL MACHINE

(75) Inventors: Brian J. Mahoney, Clive, IA (US);
Steven L. Colvin, Hawkeye, IA (US);
Manish K. Sharma, Alpharatta, GA (US)

(73) Assignee: Deere & Company, Moline, IL (US)

( * ) Notice: Subject to any disclaimer, the term of this patent is extended or adjusted under 35 U.S.C. 154(b) by 26 days.

(21) Appl. No.: 11/481,282

(22) Filed: Jul. 5, 2006

(65) Prior Publication Data

US 2006/0250281 A1     Nov. 9, 2006

Related U.S. Application Data

(60) Continuation of application No. 11/069,641, filed on Feb. 28, 2005, which is a division of application No. 10/209,157, filed on Jul. 31, 2002, now abandoned.

(51) Int. Cl.
*G08G 1/23*     (2006.01)
(52) U.S. Cl. .................. 340/988; 340/506; 340/679; 340/684; 340/989; 701/29; 701/208
(58) Field of Classification Search ............ 340/988, 340/989, 990, 991, 992, 993, 506, 539.13, 340/825.49, 679, 684; 701/1, 207, 208, 117, 701/29, 213, 206, 211, 209
See application file for complete search history.

(56) References Cited

U.S. PATENT DOCUMENTS

| 5,400,018 | A | * | 3/1995 | Scholl et al. ............... 340/10.3 |
| 5,432,841 | A | | 7/1995 | Rimer |
| 5,808,907 | A | | 9/1998 | Shetty et al. |
| 5,922,040 | A | | 7/1999 | Prabhakaran |
| 6,108,591 | A | | 8/2000 | Segal et al. |
| 6,199,422 | B1 | | 3/2001 | Boerhouf et al. |
| 6,297,742 | B1 | | 10/2001 | Canada et al. |
| 6,298,308 | B1 | | 10/2001 | Reid et al. |
| 6,331,825 | B1 | * | 12/2001 | Ladner et al. ............... 340/988 |
| 6,477,452 | B2 | | 11/2002 | Good |
| 6,487,375 | B2 | | 11/2002 | Ferrer et al. |
| 6,505,106 | B1 | * | 1/2003 | Lawrence et al. ............. 701/35 |
| 6,571,191 | B1 | | 5/2003 | York et al. |
| 6,836,539 | B2 | | 12/2004 | Katou et al. |

FOREIGN PATENT DOCUMENTS

EP     0 383 593 A2     8/1990

* cited by examiner

*Primary Examiner*—Davetta W. Goins

(57) ABSTRACT

A method of providing information from a plurality of fleet machines located at a plurality of locations for purposes of permitting a manager of fleet equipment to make management decisions pertaining to a fleet comprised of such equipment, monitoring functional operational data from individual machines in a fleet of machines, conveying the monitored data to a remote server, converting the monitored data into a first group pertaining to current existing operational data, and into a second group comprised of past historical data, and transmitting by wireless means to a person having responsibility for the fleet information at least one of the groups of data.

21 Claims, 6 Drawing Sheets

METHOD FOR REMOTE MONITORING EQUIPMENT FOR AN AGRICULTURAL MACHINE

CROSS REFERENCE TO RELATED APPLICATIONS

This application is a continuation of prior U.S. patent application Ser. No. 11/069,641, filed Feb. 28, 2005, which is a divisional application of Ser. No. 10/209,157, filed Jul. 31, 2002 now abandoned.

FIELD OF THE INVENTION

The invention relates to providing information to enhance managers of fleet equipment to manage their fleets by receiving data from a local server on one or more of the pieces of equipment in order that they may react to immediate problems and to plan for future utilization based upon the fleet's pasts performance and utilization. The information is received in the form of either snapshot reports on current conditions, or summary reports based on data gathered over a period of time.

BACKGROUND OF THE INVENTION

Current Fleet Management systems have proven to be ineffective for Fleet Managers to manage their fleets. Fleet Managers manage their fleets with outdated and hand collected data that makes it hard for them to react to immediate problems and plan for future fleet utilization based on their fleet's past performance and utilization.

Further, the collected information may be a collection of current conditions and past conditions which are cumbersome to assimilate by the receiver of the information.

Therefore, the principal object of this invention is to provide a method of collecting data from a plurality of machines in a fleet of machines, wherein snapshot reports of current conditions, or summary reports on the historical state of a machine, can be generated and can be forwarded to the fleet manager at a remote monitoring system.

A further object of this invention is to provide a method for remote monitoring equipment for an agricultural machine which will permit the capture of additional information about the machine and its use without ever visiting the machine.

These and other objects will be apparent to those skilled in the art.

SUMMARY OF THE INVENTION

Figure 1:
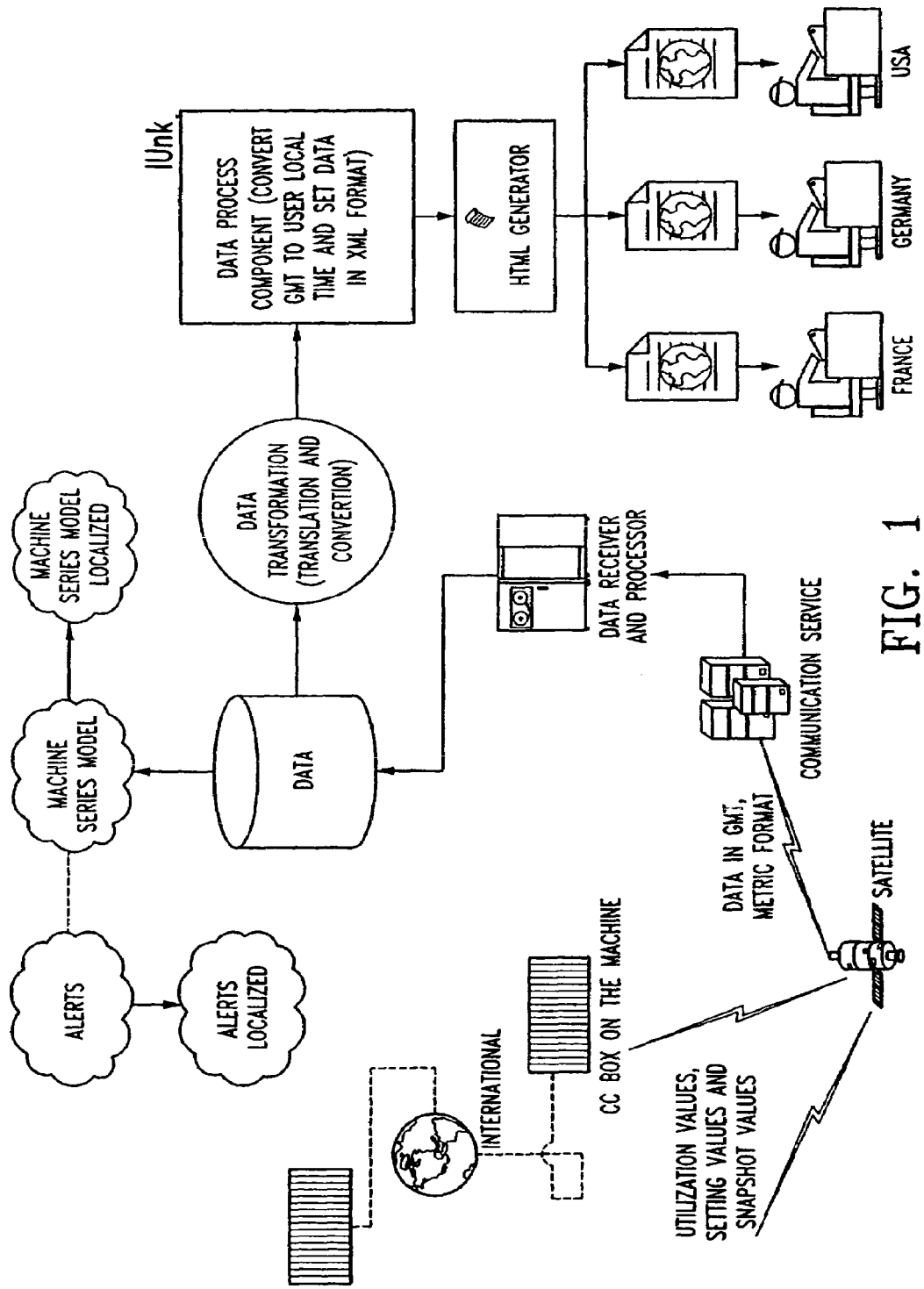
FIG. 1 is a flow sheet showing internationalization of machine data.
Figure 2:
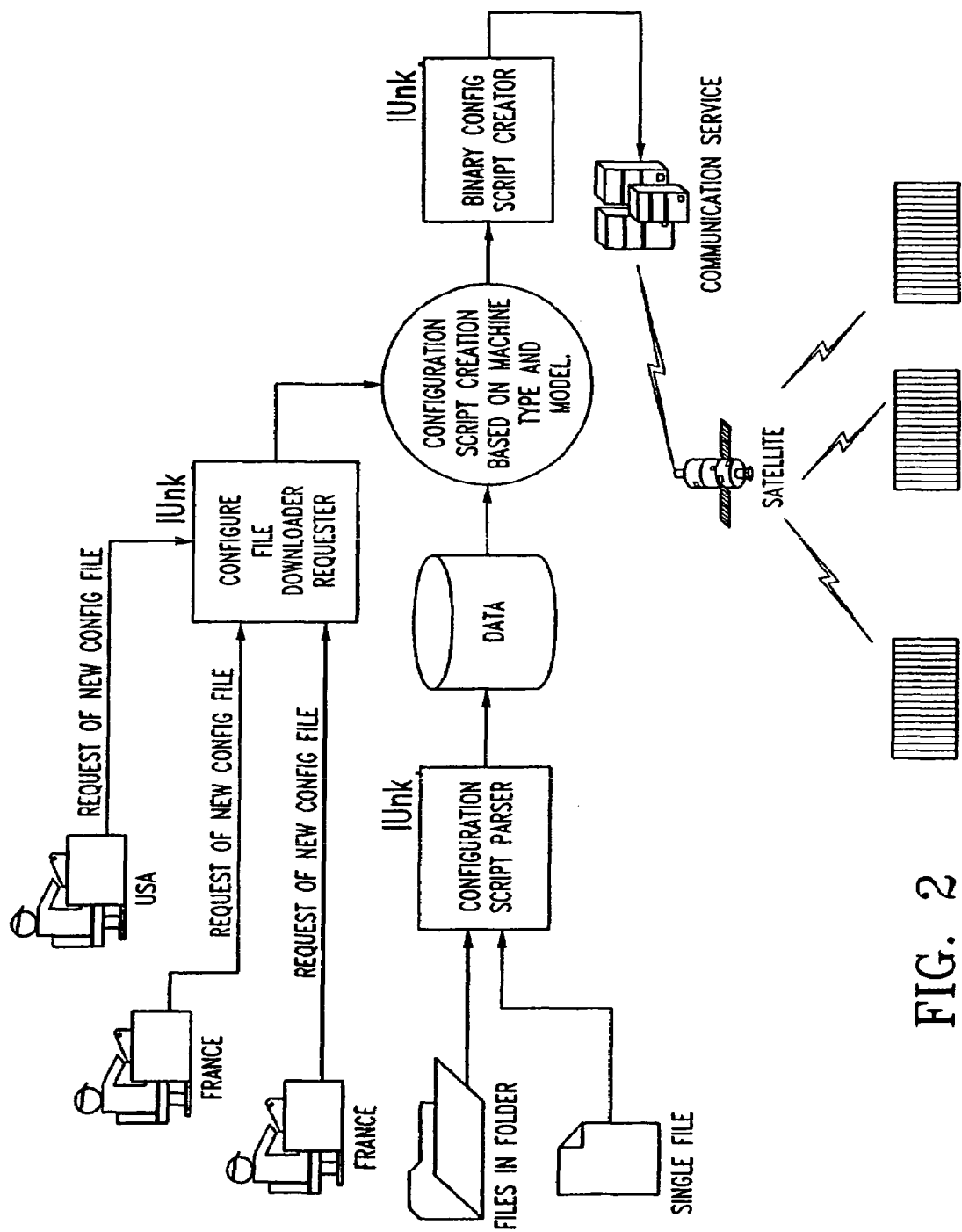
FIG. 2 is a flow sheet showing configuring the controllers for different machine types.
Figure 3:
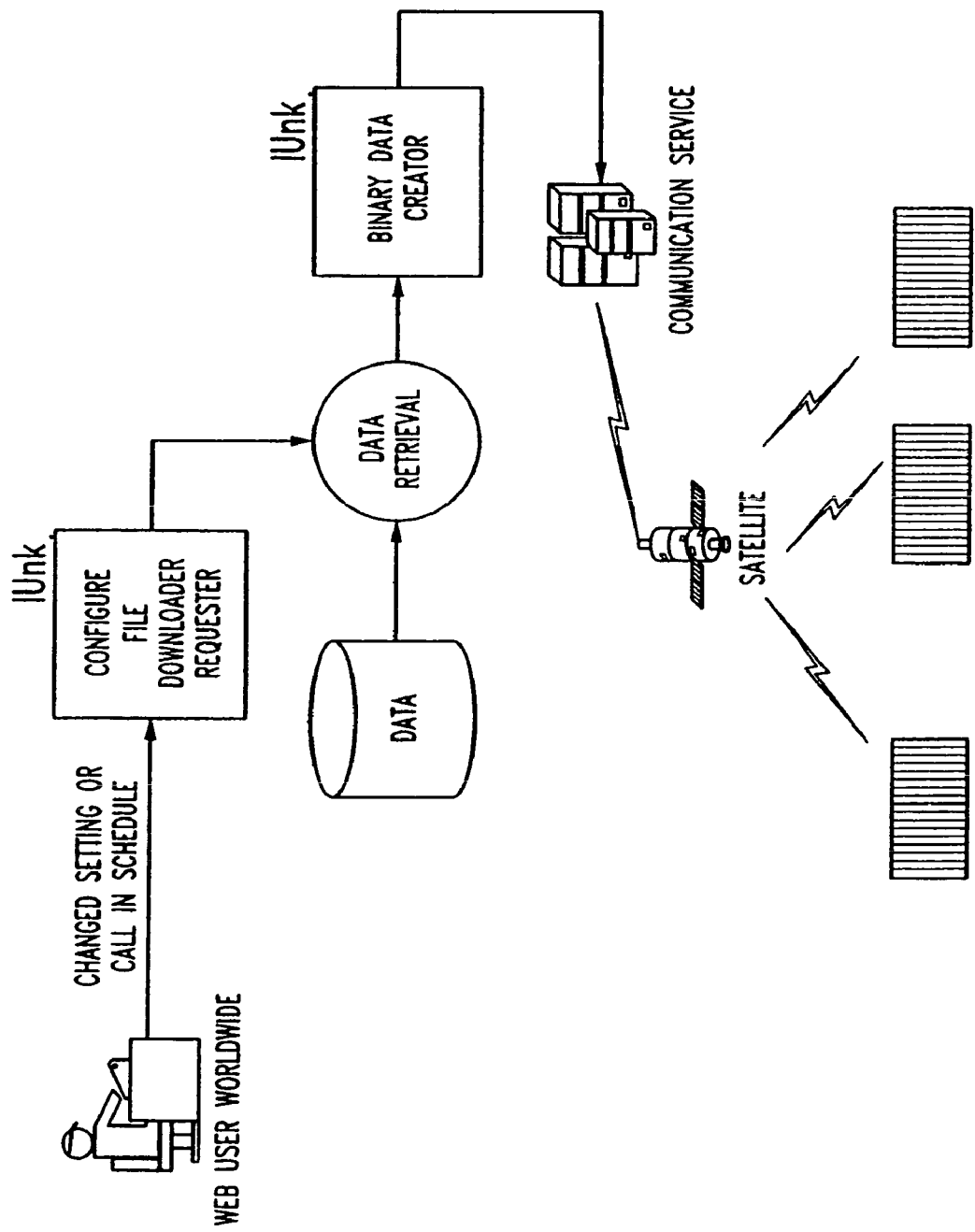
FIG. 3 is a flow sheet showing machine settings and call-in schedule.
Figure 4:
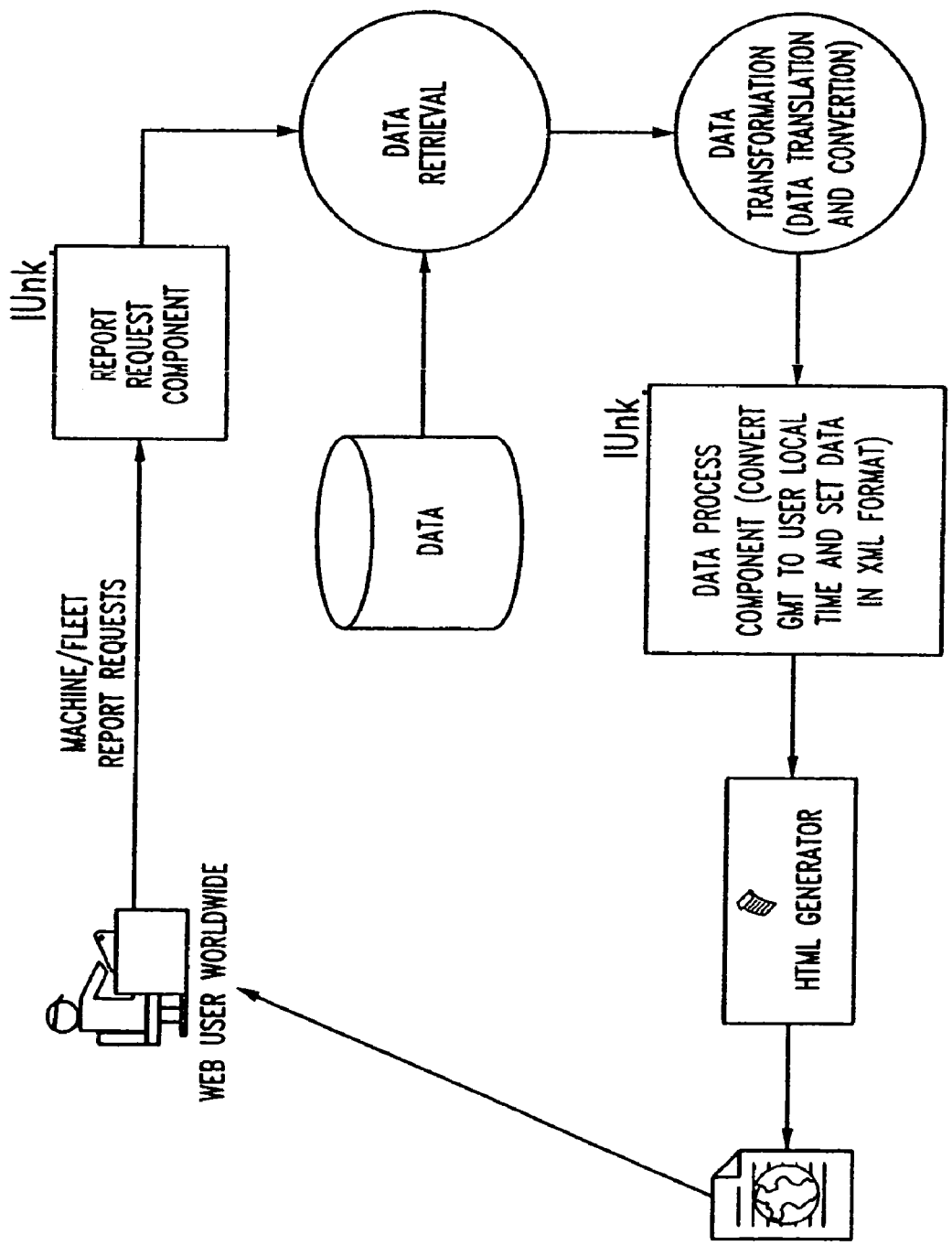
FIG. 4 is a flow sheet showing monitor machine information.
Figure 5:
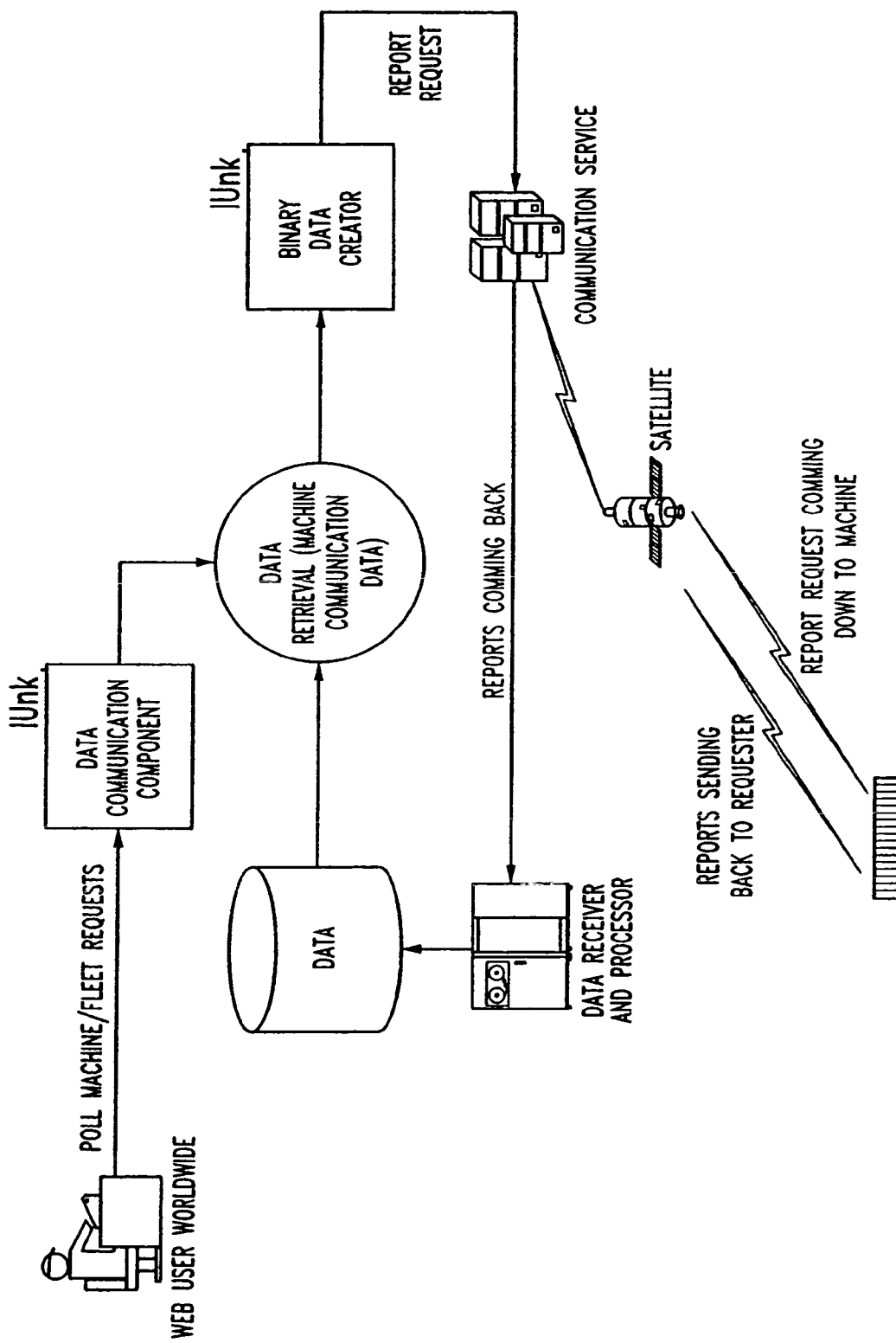
FIG. 5 is a flow sheet showing polling machine status.
Figure 6:
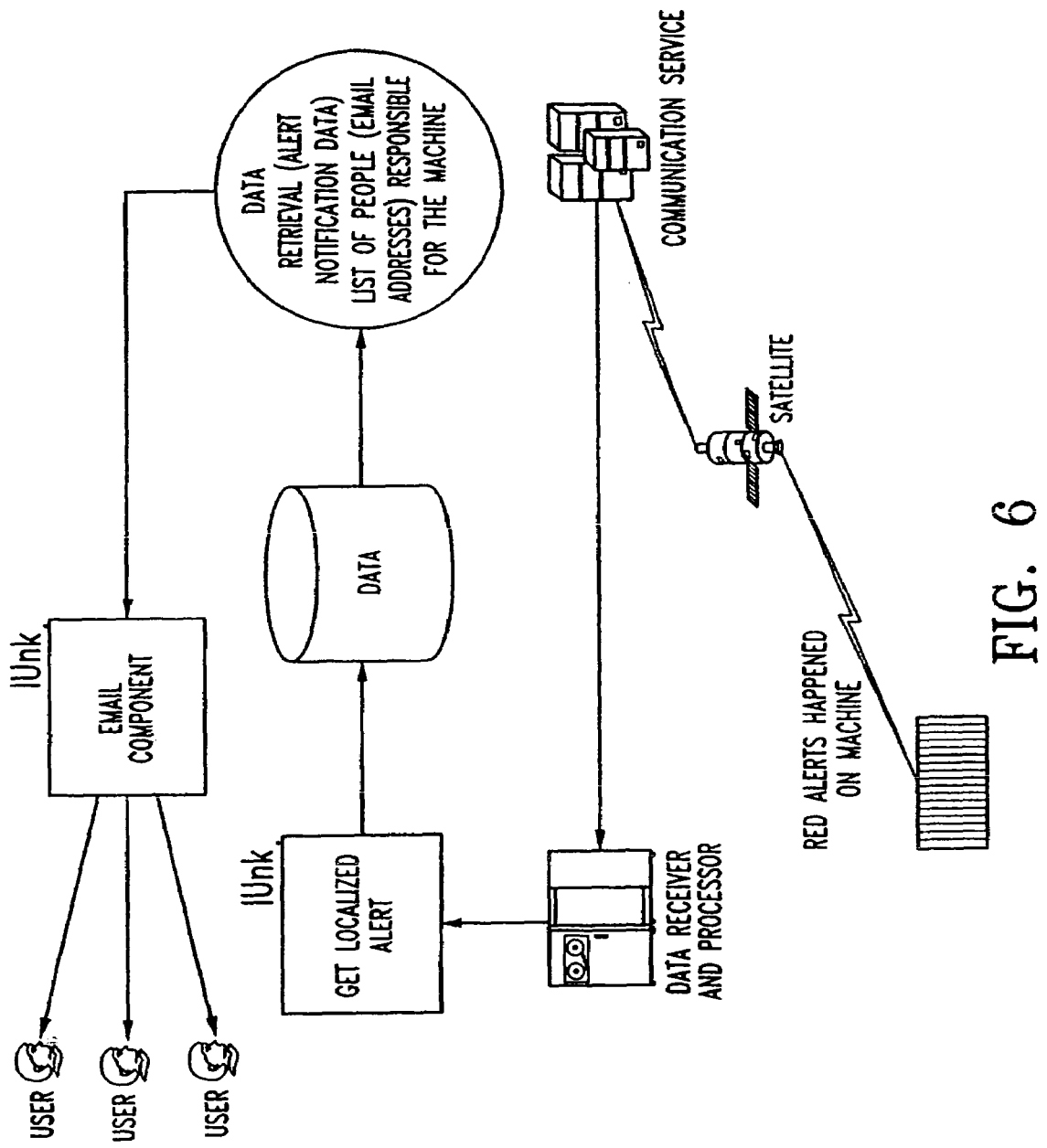
FIG. 6 is a flow sheet showing stop engine alert notification.

The method of this invention offers a complete management system composed of the remote monitoring equipment for an agricultural machine (which is part of a fleet of agricultural machines). The monitoring equipment comprises a communications controller/computer provided on the agricultural machine, one or more connections to the machine's data buses (CAN, CCD, RS232), and other controllers on the machine. The controllers are connected to a machine data bus and to sensors which pass alert information derived from these sensors to the communications controller/computer which automatically generates and sends snapshot and summary reports to a central information server. A central information server comprising a communications server handles the over-the-air communications protocol to the remote agricultural machines communications controller/computer and the network communications to a data server. The data server accepts the snapshots and summary reports from the agricultural machine and when requested, generates fleet level snapshot reports, machine level snapshot reports, fleet level summary reports and machine level summary reports, which are sent to a customer service application. The customer service application takes requests from a fleet manager via network for a fleet level snapshot report, a machine level snapshot report, or a fleet level summary report on a machine level summary report, and passes the report requests to a data service and then displays the report to the fleet manager.

DESCRIPTION OF THE PREFERRED EMBODIMENT

The invention proposes monitoring equipment that monitors information about the historical state of the machine primarily when it is working, transporting, idling or when it is not operating at all. The information about the historical state of the machine, also known as the summary report, can determine the productivity of the machine or a fleet of machines over a period of time. This report is capable of generating configurable utilization information about which can include the area covered, engine hours, ground speed, engine speed, fuel used, fuel used/hour, load Factor and rear PTO speed. Advice given in the summary report is automatically sent to the equipment manager for an immediate response.

A second feature of the invention is its ability to provide machine management snapshot reports to the user. This feature functions in a similar way as the previous component with the main difference being the users ability to request snapshot reports about the current machine state. When an emergency or red alert call occurs, a snapshot report is automatically sent transmitted. A red alert is operational data predetermined to be an emergency condition, such as fire, or an overturned machine, for example. The snapshot capability provides a map with the current location of the machine that enables the service personnel to locate the machine once a problem occurs. The fleet level snapshot report includes a map which is also capable of providing current locations of all machines in the fleet, which could possibly be used by a fuel truck operator to fuel the fleet. Another unique feature about this report is its ability to poll the machine or the entire fleet of machines for configurable current settings such as fuel tank level, ground speed, engine speed, hydraulic oil temperature, engine coolant temperature wheel slips and gears. The snapshot report is capable of providing the current status of the machine or machines indicating whether the machine is currently working, idling, transporting in an "off" mode. The primary difference between the snapshot and the summary reports is the time frame in which the data is collected in the reports. The snapshot report contains instantaneous data. The summary report contains data that was collected over a period of time.

The data is obtained from the machines of the fleet through an informational retrievable system.

The system is composed of a remote monitoring equipment for an agricultural machine (which is part of a fleet of agricultural machines) comprising a communications controller/computer provided on the agricultural machine; one or more connections to the machine's data buses (CAN, CCD, RS232); and other controllers on the machine which are connected to a machine data bus and to sensors which pass alert information derived from these sensors to the communications controller/computer. The latter component automatically generates and sends red alert and alert log reports to a central information server. The system further includes a central information Server comprising a communications server which handles the over-the-air communications protocol to the remote agricultural machines communications controller/computer and the network communications to the data server. The data server accepts the red alert and alert log reports from the agricultural machine and automatically sends red alert emails to a list of email addresses. When requested, it generates alert log reports and sends the reports to the customer service application. The customer service application takes requests from a fleet manager via a network for an alert log report and passes the report request to the data service and then displays the report that comes from data service to the fleet manager.

The primary feature of this system is the way in which the raw data is transferred throughout the system. Data, such as the configuration file, is transferred throughout this system using a method comprised of two different protocols: A low-level communication protocol that allows the communication controller (CC) to use a mobile asset management device to communicate to communication services (CS) and a high level connection based communication protocol, that transfers configuration data from the CS to the CC. The advantage of this latter protocol is the ability for both sides to actively communicate with each other as long as a connection is maintained.

Once a user requests a customer service application configuration selection for a specific machine, the machine is then triggered causing information to be passed to data services (Database) to create the configuration file. After the file is created, it is then passed via a message to communications services. Communications services (CS) then calls the CC on the specific machine and transfers the configurations file to the communications controller (CC) via an over-the-air protocol. An over-the-air protocol allows for direct configuration of the asset management device by CS.

When communication occurs between the CC and the CS a Snapshot/machine status report and an alert log if necessary, are then generated and sent to the user. This Snapshot/machine status report is sent each time to make sure that the data coming from the CC will be associated with the right configuration ID in the CC. When this report is sent, the date, time and position of the data become known. The configuration ID is essential at this point because, it is unique to each CC; it is used by the CS to track the configuration of the CC; and it is updated with each new configuration download to the CC.

The primary structure of the configuration file consists of different types of configuration records. These configuration records are essential because they help the CC to monitor information on the (CAN & CCD data) buses.

The configuration records that are sequentially transmitted includes, broadcast parameters, query parameters, attributes, utilization, snapshot, performance alert, machine state, call-in schedule and system configuration. These records are used to define to the CC how to acquire a parameter (data items which are available on the bus such as GPS speed, hitch position, time, etc.) that are being broadcast on the bus. The two types of parameters (broadcast, query) are used to define the items that are monitored on the CC, commonly known as "attributes". Attributes are monitored for collecting performance data, for generating current machine status (snapshot report/values) and for monitoring performance alerts. The machine status consists of the machine position, machine state (off, idle, working, transporting). Once attributes are generated, they are then used to collect utilization reports, which transmits all complete reporting period data for duration of 1 hour.

The distinct features of this invention exist for both the individual machine and the entire fleet of machines. The ability to produce a summary and snapshot report through remote monitoring enables the user to get information about the historical and current state of the machine (working, transporting, idling or off), the current settings or utilization breakdowns as described in 2A, a means to know how the machine or all machines within the fleet have been operated over a period of time, a means to know how productive the machine or fleet of machines have been over a period of time and a real-time fleet schedule for refueling a machine. Generating summary and snapshot reports about configurable aspects of the machine greatly increases the users ability to track the productivity of the machine in 1 hour increments, track the productivity of the operator of the machine and track the current location of each machine enabling the user to dispatch service personnel immediately is a red alert code is given. These report capabilities also enables the user to potentially increase output of the machine and operator as well as immediately preserving resources by knowing exactly where the machine is located and how it is being utilized on an hourly, daily, weekly, monthly and yearly basis. This invention is clearly a benefit because it provides fleet managers and other users automatically collected information which tells them if they are over or under equipped and by ensuring them that their needs are being met at all times with the equipment they have, it reduces the possible down-time of a machine within the fleet and it keeps the user from expending unnecessary resources to resolve the problem.

It is therefore seen that this invention will achieve at least all of its stated objectives.

What is claimed is:

1. A method of providing information from a fleet of mobile machines capable of moving to a plurality of locations, the method comprising, monitoring functional operational data from individual mobile machines in the fleet;

conveying the monitored data to a remote server;

converting the monitored data into a first summary group comprised of past historical data on productivity of the machines, and into a second snapshot group pertaining to current existing operational data, the productivity based on monitoring historical machine states of at least a working state, an idling state and non-operating state over a period of time; and transmitting to the fleet manager at least one of the groups of data to facilitate knowledge of the productivity of machines within the fleet or the fleet over the period of time or rescheduling refueling for the machines within the fleet.

2. The method of claim 1 wherein the transmitted data is conveyed wirelessly.

3. The method of claim 1 wherein the first summary group of data includes historical data at least from one of the machine functions related to machine location, area covered by the machine, engine hours, ground speed, engine speed, fuel used, fuel used/hour, load functions, current machine locations, engine coolant temperature, and rear PTO speed.

4. The method of claim 3 wherein the first summery group of data includes one or more of the past historical data relating to the machine functions of the second snapshot group.

5. The method of claim 1 wherein whenever the step of monitoring senses operational data predetermined to be an emergency condition, such data is automatically transmitted to the fleet manager.

6. The method of claim 1 wherein the second snapshot group includes current and instantaneous data at least from one of the machine functions related to fuel tank level, ground speed, engine speed, hydraulic oil temperatures, engine coolant temperature, wheel slips and gears, whether the machine is currently in the working state, the idling state, or in a transport mode.

7. The method of claim 1 further comprising passing emergency information to an information retrievable system used with the machine composed of remote monitoring equipment comprising a communications controller/computer on the machine and connected to data buses on the machine, and secondary controllers on the machine connected to further buses on the machine and to further sensors on the machine.

8. The method of claim 7 wherein the information retrievable system further comprises a central information and communications server which handles over-the-air information transmission to a remote machine communications controller/computer and to a network communications system, and to a data server.

9. The method of claim 5 wherein the operational data predetermined to be emergency conditions is reported to a plurality of predetermined remote destinations.

10. The method of claim 9 wherein the data pertaining to emergency conditions is sent to a remote customer service destination.

11. The method of claim 10 Wherein the data concerning the emergency conditions is sent to the fleet manager along with any report from the remote customer service destination.

12. A method of providing information from a plurality of mobile machines located at a plurality of locations, the method comprising the steps of:
  providing an information retrievable system including a customer service application and a data server;
  requesting a configuration selection from the customer service application; and
  triggering at least one machine of the plurality of mobile machines to cause productivity information to be passed to the data server based on the configuration selection to create a configuration file, the productivity information based on monitoring historical machine states of at least a working state, an idling state and non-operating state over a period of time.

13. The method of claim 12 wherein the configuration file is comprised of data regarding at least one of machine location, area covered by the machine, engine hours, ground speed, engine speed, fuel used, fuel used/hour, load functions, current machine location, engine coolant temperature, and rear PTO speed.

14. The method of claim 12 wherein the informational system further comprises a central information and communications server which handles over-the-air information transmission to the data server.

15. The method of claim 12 wherein the data server accepts operational data predetermined to be emergency conditions and reports the same to a plurality of predetermined remote destinations via e-mail.

16. A system for remotely monitoring one or more mobile agricultural machines in a fleet of mobile agricultural machines, the system comprising:
  a communications computer on each mobile agricultural machine;
  at least one controller on each mobile agricultural machine connected to at least one sensor for monitoring functional information on the mobile agricultural machine;
  at least one data bus between the communications computer and the at least one controller for transmitting functional information to the communications computer;
  a remote central information server capable of communicating with the communications computers on the fleet Of mobile agricultural machines, the remote information server capable of accepting functional information from the communications computers on the fleet of mobile machines; and
  a data server connected to the remote central information server for accepting functional information from the central information server, processing the functional information received, generating a report of current operational data and a summary of past historical data, the data server capable of identifying any functional information that is predetermined to be an emergency condition, the data server automatically generating and sending an email containing the emergency condition information to at least one email address.

17. The system of claim 16 wherein data is transmitted between the communications computers and the remote information server via wireless means.

18. The system of claim 16 wherein the summary of past historical data includes at least one of the machine functions related to machine location, area covered by the machine, engine hours, ground speed, engine speed, fuel used, fuel used/hour, load functions, current machine locations, engine coolant temperature, and rear PTO (power-take-off) speed.

19. The system of claim 16 wherein the current operational data includes at least one of the machine functions related to fuel tank level, ground speed, engine speed, hydraulic oil temperatures, engine coolant temperature wheel slips and gears, whether the machine is currently working, idling, or in a transport mode.

20. The method according to claim 1 further comprising:
  identifying any functional Operational date that is predetermined to be an emergency condition, and
  automatically generating and sending an email containing the emergency condition information to at least one email address.

21. The method according to claim 12 further comprising:
  identifying any functional operational data in the configuration file that is predetermined to be an emergency condition, and
  automatically generating and sending an email containing the emergency condition information to at least one email address.

* * * * *